United States Patent
Bergling

[15] 3,685,634
[45] Aug. 22, 1972

[54] CONVEYOR BELT FOR SHEET METAL

[72] Inventor: Charles Gunnar Birger Bergling, Orebro, Sweden

[73] Assignee: Ingenjorsfirma Hebe A,B, Orebro, Sweden

[22] Filed: June 8, 1970

[21] Appl. No.: 44,409

[52] U.S. Cl. .................................................. 198/41
[51] Int. Cl. ............................................. B65g 17/46
[58] Field of Search ............................... 198/41, 160

[56] References Cited

UNITED STATES PATENTS

| | | | |
|---|---|---|---|
| 3,269,522 | 8/1966 | Fogg et al. | 198/160 |
| 1,343,648 | 6/1920 | Smith | 198/41 |
| 3,017,009 | 1/1962 | Wiggins et al. | 198/41 |

Primary Examiner—Richard E. Aegerter
Attorney—Pierce, Scheffler & Parker

[57] ABSTRACT

A conveyor system for sheet metal comprises a roller conveyor, a chain conveyor and electromagnetic means attached to the chain conveyor for aiding in transport of the sheet metal. The electromagnetic means is shiftable from one position in which it is inoperable to a different position in which it is operable.

3 Claims, 3 Drawing Figures

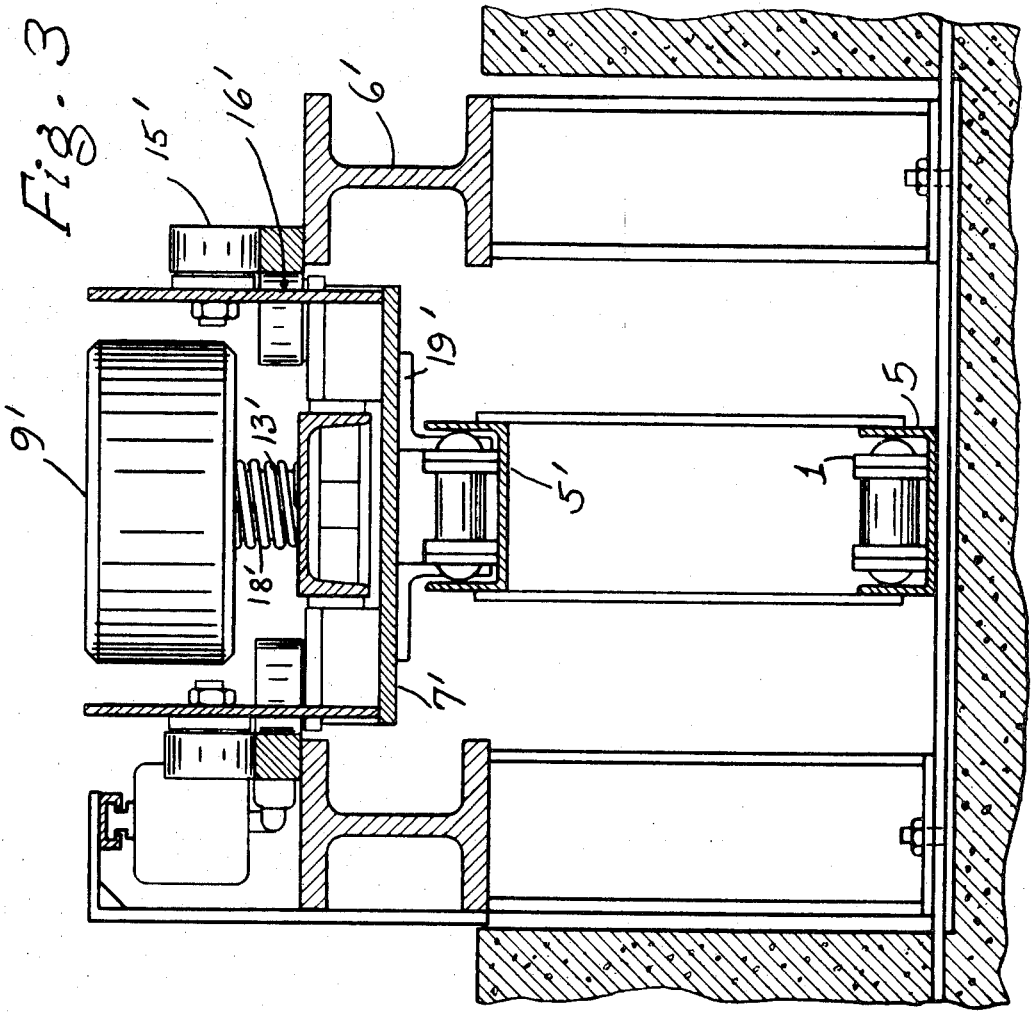

CONVEYOR BELT FOR SHEET METAL

The invention relates to a conveyor system for sheet-metal, especially large and very heavy sheets, for example for use in ship-building. The conveyor system according to the invention is of the type comprising a roller conveyor for the sheet-metal, a chain conveyor arranged below the roller conveyor and at least one electromagnet attached to the chain conveyor and arranged to be fixed to the lower side of a sheet of metal so that the sheet can be conveyed with the help of the chain conveyor.

The connection between the chain conveyor and the sheet-metal is thus taken care of by an electromagnet. It is desirable to be able at any moment to detach the electromagnet from the sheet of metal and reattach it to the sheet. In order to be able to move the electromagnet under the sheet without difficulty, the electromagnet must be a certain distance from the sheet. This distance may not be too short since the sheets of metal are not absolutely flat. In order to be able afterwards to re-attach the electromagnet to the sheet, it must be lifted the distance mentioned. If the distance is short the electromagnet can be lifted by means of its own magnetic force. If the distance is greater, difficulties arise since the magnetic attraction decreases sharply with increasing distance.

It has been found according to the invention that the electromagnet can be lifted more easily to make contact with the sheet-metal if it is activated by a spring or counterweight so that only a relatively small force is required to lift it into contact with the lower side of the sheet-metal. The electromagnet can thus easily be designed with sufficient magnetic force to lift it to make contact with the sheet-metal, even if the distance between the magnet and the sheet-metal is relatively great.

In the following the invention will be explained with reference to the accompanying drawings.

FIG. 3 illustrates a modification of the structure shown in FIG. 1.

Figure 1:
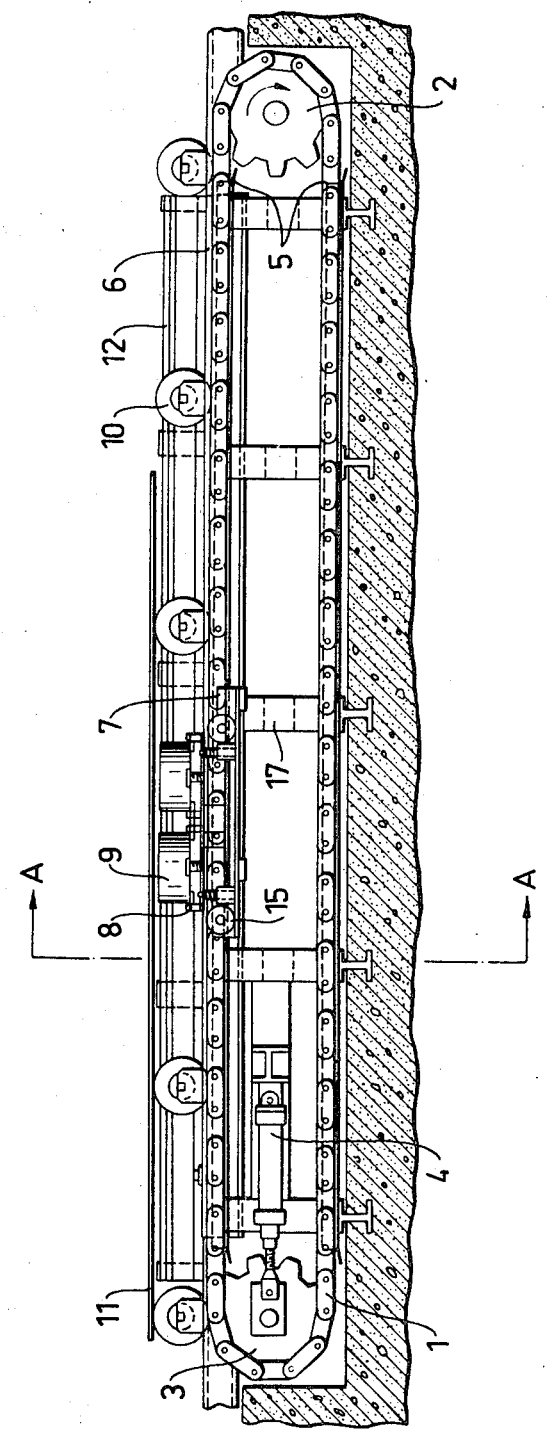
FIG. 1 shows a conveyor belt according to the invention, seen from the side.

The conveyor system according to the drawing comprises a stand 17 supporting two parallel beams 6. A carriage 7 is supported by these beams 6 by means of wheels 15 and the carriage 7 is guided laterally on the beams by means of wheels 16. The carriage 7 supports a holder 8 for the magnet. This holder is provided on the lower side with four guides 18 which run in holes in the carriage 7. Coil springs 13 are arranged around the guides 18 and support the holder 8. Two electromagnets 9 are mounted on the holder 8. The magnets are fed via a slip rail with direct current from a busbar 12 extending parallel with the beams 6. Each electromagnet is supported by four coil springs 14 which permit the upper surface of the magnet to deviate somewhat from horizontal position.

The conveyor system also comprises an endless chain 1. The upper and lower parts of this are supported by U-shaped beams 5. The chain cooperates with a driving wheel 2 driven by a motor, not shown, and with a wheel 3 which can be moved longitudinally by means of a hydraulic or pneumatic device 4. With the help of this the chain can be tensioned as desired. The upper part of the chain 1 is attached to the carriage 7 by holding means 19.

The upper surface of the electromagnets 9 is at some distance from the lower side of a sheet 11 on the roller conveyor 10. This distance is chosen so that in currentless condition the electromagnets do not touch the sheet of metal even if this is not entirely flat, for instance if it sags somewhat between two adjacent rollers of the roller conveyor. The carriage 7 with the electromagnets 9 can consequently be moved freely under the sheet 11 so that the electromagnets can be attached at any desired point on the sheet-metal. When current is supplied to the electromagnets the magnetic attraction between the sheet and the magnets is sufficiently strong to lift the magnets up so that they make contact with the sheet of magnetic material. This happens even if the sheet is not entirely flat, that is if it curves slightly up over the electromagnets. Thanks to the springs 13, the weight of the electromagnets themselves has been eliminated so much that even a relatively slight force is sufficient to lift the magnets. The springs 13 should preferably be so long that they exert an upwardly directed pressure on the holder 8 during its entire upward movement.

Figure 2:
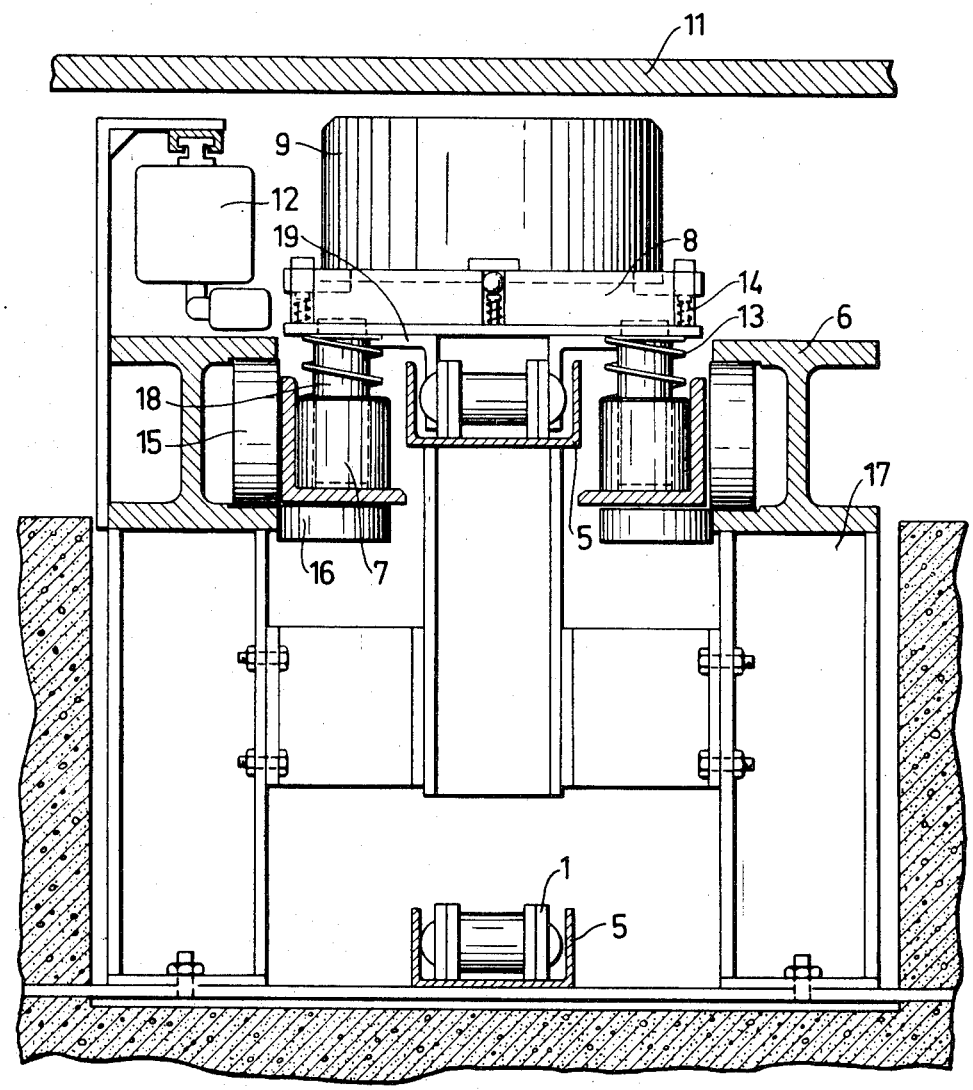
FIG. 2 shows on a larger scale a section along the line A—A in FIG. 1.

When the electromagnets 9 have been attached to the sheet-metal in this way, it can be moved in the desired direction with the help of the chain conveyor 1. The current to the electromagnets is then broken in order to free the sheet-metal and the electromagnets fall by their own weight to the position shown in FIG. 2. If, for example, a sheet of metal is to be conveyed on the conveyor system shown in FIG. 1 in a direction from left to right, the electromagnets may be allowed to cooperate with the front part of the sheet during the initial stage. They can then easily be moved in the manner described to cooperate with the rear part of the sheet so that the front edge of the sheet may project past the driving wheel 2.

As an example of the dimensions of the electromagnet in a conveyor system according to the invention may be mentioned an electromagnet having a weight of 50 kg and a magnetic force of 3,500 kg when the magnet is in contact with the sheet-metal. At a distance of 20 mm between magnet and sheet-metal, which is the greatest distance likely to occur, the magnetic force is only 30 kg. The magnet is mounted on springs which together have a spring force of 40 kg. This force is substantially constant over the entire region within which the magnet operates. In order to lift the magnet, therefore, a force of 10 kg is required. There is thus an excess force of 20 kg to lift the magnet up to the sheet-metal.

While in the foregoing the conveyor system of the invention has been described as involving the use of two springs 13, 13 supporting an electromagnet 9, this arrangement may, if desired, be modified so as to have the electromagnet supported on a single spring. This embodiment is illustrated in FIG. 4. According thereto, an electromagnet 9' is supported on a carriage 7' by means of a guide 18' and a single spring 13'. One end of guide 18' is secured to the carriage 7' or to a holder mounted on the carriage. The other end of guide 18', which is within electromagnet 9', is provided with for instance a ball so that the electromagnet 9' can deviate from horizontal position if needed.

What is claimed is:

1. Conveyor system for sheet-metal, comprising a roller conveyor (10) for the sheet-metal (11), a chain conveyor (1) arranged below the roller conveyor (10) and at least one electromagnet (9) attached to the chain conveyor and arranged to be fixed to the lower side of a sheet of metal so that the sheet can be conveyed with the help of the chain conveyor, characterized in that when not in use the electromagnet (9) is situated with its upper surface slightly below the plane defined by the roller conveyor (10), that furthermore the electromagnet (9) is supported on at least one pressure spring (13), only a relatively small force being required to lift it to make contact with the lower side of the sheet, and that the magnetic force of the electromagnet is such that it is sufficient to lift the magnet to make contact with the sheet.

2. Conveyor system according to claim 1, characterized in that at least one electromagnet (9) is supported by a holder (8) mounted with the help of springs (13) on a carriage (7) attached to the chain conveyor (1).

3. Conveyor system according to claim 2, characterized in that the holder (8) is guided in relation to the carriage (7) by means of vertical guides (18) and that coil springs (13) are arranged around these guides to support the holder.

* * * * *